(12) United States Patent
Iyengar et al.

(10) Patent No.: US 7,406,597 B2
(45) Date of Patent: Jul. 29, 2008

(54) METHODS FOR EFFICIENTLY AUTHENTICATING MULTIPLE OBJECTS BASED ON ACCESS PATTERNS

(75) Inventors: Arun Kwangil Iyengar, Yorktown Heights, NY (US); Jian Yin, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 10/977,207

(22) Filed: Oct. 29, 2004

(65) Prior Publication Data

US 2006/0095763 A1     May 4, 2006

(51) Int. Cl.
*H04L 9/00*     (2006.01)
(52) U.S. Cl. .......................... 713/167; 726/11; 726/12; 707/2; 707/102
(58) Field of Classification Search ................ 713/167; 726/11, 12
See application file for complete search history.

(56) References Cited

U.S. PATENT DOCUMENTS 6,829,610 B1 * 12/2004 Hickman et al. ............. 707/10
7,155,466 B2 * 12/2006 Rodriguez et al. .......... 707/205

OTHER PUBLICATIONS

U.S. Appl. No. 10/977,206, filed Oct. 29, 2004, A.K. Iyengar et al.

C.K. Wong et al., "Digital Signatures for Flows and Multicasts," IEEE/ACM Transactions on Networking, vol. 7, No. 4, pp. 502-513, Aug. 1999.
R.C. Merkle, "A Certified Digital Signature," Proceedings on Advances in Cryptology, pp. 218-238, 1998.
A. Freier et al., "The SSL Protocol Version 3.0," Transport Layer Security Working Group, pp. 1-63, Nov. 1996.
S. Miner et al., "Graph-Based Authentication of Digital Streams," Proceedings of the IEEE Symposium on Research in Security and Privacy, May 2001, p. 232-246.
A. Perrig et al., "Efficient and Secure Source Authentication for Multicast," Proceedings 8th Annual Symp. on Network and Distributed System Security (NDSS 2001), Reston, VA: Internet Society, Feb. 2001, pp. 35-46.

* cited by examiner

*Primary Examiner*—Kimyen Vu
*Assistant Examiner*—April Y Shan
(74) *Attorney, Agent, or Firm*—Mark Wardas; Ryan, Mason & Lewis, LLP

(57) ABSTRACT

Techniques for efficiently authenticating multiple objects and clustering objects based on access patterns are provided. For example, in an illustrative aspect of the invention, a technique for generating and/or reading authentication information, wherein the authentication information provides evidence that a plurality of objects were one of generated and sent by an entity, comprises using one or more object access patterns indicative of whether at least two of the plurality of objects are accessed within a similar time period to group objects together to reduce an overhead for at least one of generating and reading the authentication information.

1 Claim, 6 Drawing Sheets

FIG. 5    WRITE SETS

| | ELEMENTS | WEIGHT |
|---|---|---|
| W1: | A, C | 3 |
| W2: | D, G | 6 |
| W3: | I | 6 |
| W4: | O, E, X, Z | 6 |
| W5: | W, T | 6 |
| W6: | J | 6 |

FIG. 7

```
         ┌──────────────────────┐
         │   GROUP OBJECTS IN   │── 702
         │  WRITE SETS TOGETHER │
         └──────────┬───────────┘
                    ▼
         ┌──────────────────────┐
         │   AGGREGATE READ     │
         │ ACCESSES OF OBJECTS  │── 704
         │    IN WRITE SETS     │
         └──────────┬───────────┘
                    ▼
         ┌──────────────────────┐
         │ GENERATE PARTITIONED │── 706
         │ AUTHENTICATION GROUPS│
         └──────────────────────┘
```
700

FIG. 8

READ SETS

R1: | A, I, J |   3      802
R2: | D, W   |   6
R3: | A, D, W|   1
R4: | O, W   |   1

R1: | W1, W3, W6 |   3    804
R2: | W2, W5     |   6
R3: | W1, W2, W5 |   1
R4: | W4, W5     |   1

AUTHENTICATION GROUP 1: D, G, W, T    806
AUTHENTICATION GROUP 2: A, C, I, J
AUTHENTICATION GROUP 3: O, E, X, Z

ORDER: D G W T $M_1$: H(D)
$M_2$: H(G)
$M_3$: H(W)
$M_4$: H(T)
$M_{1-2}$: H($M_1$, $M_2$)
$M_{3-4}$: H($M_3$, $M_4$)
$M_{1-4}$: H($M_{1-2}$, $M_{3-4}$)
R: PKI($M_{1-4}$)

Sig(D): $M_2$, $M_{1-2}$, R
Sig(G): $M_1$, $M_{1-2}$, R
SIGNATURE SHARED BY D AND G: $M_{1-2}$, R

METHODS FOR EFFICIENTLY AUTHENTICATING MULTIPLE OBJECTS BASED ON ACCESS PATTERNS

CROSS-REFERENCE TO RELATED APPLICATION

This application is related to the concurrently filed U.S. patent application Ser No. 10/977,206 and entitled "Systems and Methods for Efficiently Clustering Objects Based on Access Patterns," the disclosure of which is incorporated by reference herein.

FIELD OF THE INVENTION

The present invention generally relates to content distribution techniques and, more particularly, to techniques for efficiently authenticating multiple objects based on access patterns.

BACKGROUND OF THE INVENTION

Content distribution systems include content consumers that consume data and content publishers that publish data to content consumers. In an environment such as the Internet or World Wide Web (WWW or the "web"), content publishers are typically web servers. Content consumers are web clients which access the content of the web server.

Three characteristics of a content distribution system are worth noting.

First, there are usually a large number of content consumers corresponding to one content provider. Moreover, many content consumers have limited computation power. For example, a web client can be a hand-held device. Thus, it is desirable to reduce the overhead associated with retrieving the content provided by content providers.

Second, a content consumer usually selectively retrieves the objects provided by content providers instead of retrieving all of the objects.

Third, content consumers often retrieve content through a third party. The third party should have the capacity to serve a large number of content consumers. After receiving the content from the content provider, the third party can service the requests of content consumers through its cache and thus offload load from the content providers. For example, a consumer can retrieve the content of a web server through a web cache. This scenario is especially common in peer-to-peer and grid computing environments. Thus, the third party needs to have some capacity to convince the content consumer that the content fetched is indeed produced by the content provider.

Content distribution systems may employ the Secure Sockets Layer (SSL) protocol. SSL is a secure web-based transport protocol that allows communication between two parties to be authenticated. By way of example, the SSL protocol is described in detail in A. Freier et al., "The SSL Protocol Version 3.0." Each of the two parties has a public key. In the beginning of the communication, two parties generate a shared key with their public key. The subsequent communication is then encrypted symmetrically with the shared key to reduce overhead of authentication. Authentication with SSL requires both ends of the communication to be trusted and secure. Thus, SSL can not allow authentication to go through an un-trusted or non-secure infrastructure or intermediate layer.

Content distribution systems may also employ techniques for authenticating a stream of packages such as, for example, those disclosed in C. K. Wong et al., "Digital Signatures for Flows and Multicasts," IEEE/ACM Transactions on Networking, pp. 502-513, August 1999. By linking later packets to earlier packets, the overhead of public key signatures of initial packets are amortized over many subsequent packets. Various link structures are proposed to allow the later packets to be reachable through links even when there are packet losses. In a packet stream, packets are produced and consumed in a fixed order, and each packet can not be modified. Whereas in content distribution, objects can be accessed in any order, and objects can be modified in any order.

Accordingly, a need exists for techniques which overcome the above-mentioned and other limitations associated with existing content distribution systems.

SUMMARY OF THE INVENTION

The present invention provides techniques for efficiently authenticating multiple objects and clustering objects based on access patterns.

For example, in a first illustrative aspect of the invention, a technique for generating and/or reading authentication information, wherein the authentication information provides evidence that a plurality of objects were one of generated and sent by an entity, comprises using one or more object access patterns indicative of whether at least two of the plurality of objects are accessed within a similar time period to group objects together to reduce an overhead for at least one of generating and reading the authentication information.

In a second illustrative aspect of the invention, a technique for clustering a plurality of objects based on access patterns comprises the following steps/operations. A first group of sets is created in which at least one set includes a plurality of objects read in close temporal proximity to each other. A second group of sets is created in which at least one set contains a plurality of objects written in close temporal locality to each other. A third group of sets is created in which at least one set s1 is constructed by identifying at least two objects o1 and o2 in a same set of the first group. At least one object is added to set s1 which is included in a set including object o1 of the second group. At least one object is added to set s1 which is included in a set including object o2 of said second group.

Advantageously, the invention provides techniques that use object access patterns that can be used to reduce the cost of the authentication of a plurality of objects. Object access patterns may include write patterns and read patterns. Write patterns may describe which sets of objects are often written together. Read patterns may describe which sets of objects are often read by similar clients and may include the order of these reads. Write patterns may be tracked by write sets and read patterns may be tracked by read sets and/or read order graphs. The inventive techniques can use object access patterns captured in these data structures to reduce the cost of generating signatures for a plurality of objects.

Furthermore, in one embodiment, objects that are often read and written may be grouped into one authentication tree to reduce the size of signatures without increasing processing overhead. Moreover, the objects may be placed into the authentication tree based on an access order of these objects to reduce the size of signatures further. This authentication method is especially valuable in an environment where the publisher distributes its content through intermediate layers that may not be trusted or are not secure enough. Examples are web portals, caches, peer-to-peer system, and grid-based systems.

The inventive mechanisms for clustering objects can be used for other purposes in addition to authentication. For example, they can be used for reducing the overhead of storing objects on disk.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating write sets, according to an embodiment of the present invention;

FIG. 7 is a diagram illustrating a process of partitioning objects into authentication groups, according to an embodiment of the present invention;

FIG. 8 is a diagram illustrating an example of a process of partitioning objects into authentication groups, according to an embodiment of the present invention;

DETAILED DESCRIPTION OF PREFERRED EMBODIMENTS

Figure 1:
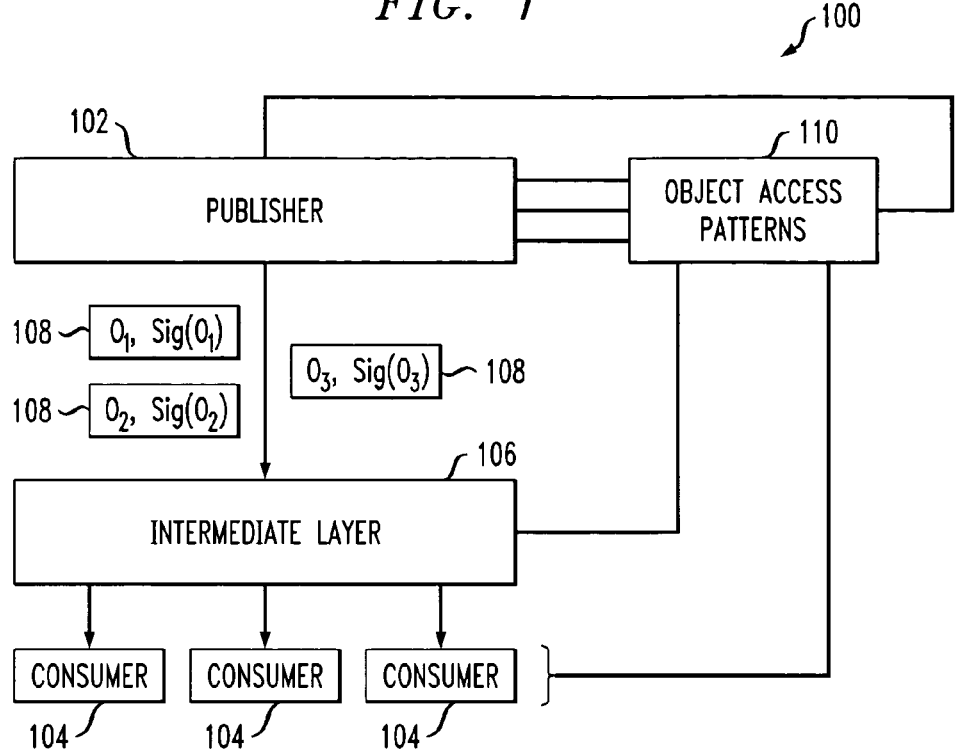
FIG. 1 is a diagram illustrating an example of a content distribution system architecture within which techniques of the present invention may be employed.

The present invention will be explained below in the context of an illustrative Internet or web implementation with respect to content authentication in a content distribution system. However, it is to be understood that the present invention is not limited to authentication in a content distribution system. Rather, the invention is more generally applicable to any environment in which it would be desirable to cluster data to improve system performance. By way of one example only, techniques of the invention may also be used in a disk storage system to cluster data by access locality.

Furthermore, content that is to be distributed is referred to generally herein as an "object." An "object" may take on many forms and it is to be understood that the invention is not limited to any particular form. For example, an object may be an electronic document such as one or more web pages. One skilled in the art could use the invention in a variety of different electronic document formats including, but not limited to, HTML (HyperText Markup Language) documents, XML (eXtensible Markup Language) documents, text documents in other formats, and binary documents. Also, the phrase "electronic document" may also be understood to comprise one or more of text data, binary data, one or more byte streams, etc. Thus, the invention is not limited to any particular type of data object. Furthermore, it is to be understood that the phrase "an access" may include either a read or an update operation. Still further, it is to be understood that the term "overhead" may include, but is not limited to, computer CPU (central processing unit) cycles, network bandwidth consumption, disk, I/O (input/output), etc.

In accordance with existing web-based techniques, a content publisher can publish content through an un-trusted or non-secure intermediate layer. To prove the authenticity of the content, a content provider can provide the intermediate layer with a signature that authenticates the content, as well as the content. A client can retrieve the content, along with the signature, and use the signature to check whether the content is generated by the content publisher. A content publisher usually publishes many objects. Clients typically read a subset of those objects.

Thus, more specifically, a content provider C may have a public key Pk associated with it. The content provider authenticates the content through this key and passes both the content and the signature to a third party. The third party is only responsible for distributing the content along with the related signature to content consumers. Once a content consumer retrieves the content and the signature from the third party, the customer can verify whether the signature is indeed generated by the content publisher for the content.

A technique for authenticating multiple objects is to use authentication trees. With an authentication tree, a group of objects can be authenticated with only one public key signature and hashing. Computing hashes is usually much cheaper than computing public key signatures. As a result, the cost of one public key signature is amortized over all the objects in the authentication. An authentication tree is usually a binary tree. The leaves are the hashes of the individual objects to be authenticated. An intermediate node is the hash of its two children. The size of the signature is determined by the number of objects in the authentication tree.

As will be explained in illustrative detail herein, two main aspects of the invention are: using object access patterns to divide the objects into authentication groups, and using likely object access orders to place objects in authentication groups.

The first aspect is to divide the objects into groups according to object access patterns. According to the present invention, the objects that are often updated and read together may be grouped together. A group may be authenticated with some group authentication technique such as authentication trees. Reducing the authentication group size can reduce the size of the signature for each object, which in turn reduces the network bandwidth, storage, and processing overhead. Grouping the objects that are often updated together reduces the number of public key signatures that are required to be generated by the content publisher and to be verified by clients.

We call a group of objects that are updated together a "write set." When the objects in a write set are updated, the authentication group is re-authenticated once instead of as many times as the number of objects in the write set. Grouping the objects that are often read together can reduce the size of authentication groups and thus the size of signatures while preserving the public key operation reduction benefit offered by large trees. A goal of this approach is to place objects that are likely to be read by the same clients into one or a small number of authentication trees. If there are no updates, a client only needs to verify one or a small number of public key signatures to verify all the objects.

Benefits are even greater when we consider updates. When an object is updated in an authentication tree, the root of the tree is generally required to be re-authenticated with an expensive public-key signature. Reducing the size of the authentication tree accessed by a client reduces the chances that the client is forced to re-authenticate the root of the tree.

A second aspect of the invention is to use the likely read order of the objects to determine object placement in a group authentication technique such as authentication trees. A goal is to place the objects of an authentication tree in such a way that the objects in adjacent reads share as much of a signature as possible. A signature of an object includes the hashes of the sibling nodes of the nodes along the path from the object to the root of the tree. Thus, maximizing the common proportion of the path from the objects to the root maximizes the proportion of the signature shared by two objects. A client can cache and reuse the shared proportion of the signatures for subsequent reads to reduce network bandwidth consumption for transferring signatures.

It is to be appreciated that the grouping or clustering methodologies of the invention are applicable to other areas besides authentication. For example, they can be used to cluster objects on disk to improve performance.

FIG. 1 is a diagram illustrating an example of a content distribution system architecture within which techniques of the present invention may be employed. As shown, content distribution system 100 includes content publisher 102 and several content consumers 104. Content consumers may be referred to herein as clients. The responsibility of a content publisher is to generate content. An intermediate layer 106 distributes the content directly to clients. An intermediate layer can be, by way of example, a portal, a cache, a peer-to-peer system, a grid system, etc. An intermediate layer is usually introduced to improve performance, increase scalability, and/or add functionalities.

Publisher 102 and intermediate layer 106 can be located in different software modules on the same physical machine or can be located on different machines. Hardware and software protections may be provided to ensure that compromised intermediate layers can not automatically compromise the publisher.

The inventive techniques can allow a trusted publisher 102 to publish content over an un-trusted or non-secure intermediate layer. There are a number of reasons why an intermediate layer can be less trusted or secure than the publisher. First, intermediate layer 106 can be responsible for delivering the content to a large number of clients and thus must be designed for high performance and scalability, which can make this layer quite complex and be prone to security vulnerabilities. Furthermore, performance requirements often compel the use of the latest technology in this layer, which could make this layer less stable. Second, an intermediate layer may not be in the same administration domain as the publisher and thus may not have the same security standard as the publisher. Examples include web caches and proxies in a peer-to-peer or grid environment which may not be securely administrated and may be given security patches or a web portal that redistributes the content.

According to the present invention, a publisher authenticates its content by attaching signatures to its contents and sends them to the intermediate layer. This is illustrated as 108 in FIG. 1, wherein $O_n$ (n=1, 2, 3, ...) refers to the object and $Sig(O_n)$ refers to the attached signature. When a client retrieves an object from the intermediate layer, it also retrieves the signature and can verify the authenticity of the object.

A publisher has a public key and private key pair. The public key is also known to clients and clients use the public key to check the authenticity of the content. A naïve method is for the publisher to sign every object using its private key and for clients to check the authenticity using the public key. But public key operations can be prohibitively expensive for both publishers and clients. In accordance with the present invention, methodologies are provided to exploit object access patterns 110 to reduce the cost of authenticating multiple objects.

According to the present invention, the cost of authentication of multiple objects can be reduced with two techniques: using object access patterns to divide the objects into authentication groups, and using likely object access order to place objects in each authentication group.

The first technique is to divide objects into authentication groups. The objects that are often accessed together are grouped together. A group of objects that are updated together is called a write set. In the present invention, the objects in a write set may be in an authentication group. When a write set is updated, the authentication group is re-authenticated once instead of as many times as the number of the objects in the write set. In some examples, each write set is an authentication group. In other examples, the write sets are further grouped into authentication groups. The write sets whose objects are often read together are grouped into an authentication group. A goal is to reduce the expected number of authentication groups that are needed to contain objects accessed by one client.

The second technique is to use the likely order of object accesses to place objects in an authentication group. One example of the group signature technique is authentication trees. Consider an example in which an object B is likely to be accessed immediately after the object A. Let P1 be the path from A to the root and P2 the path from B to the root. Let P3 be the part of the paths that are shared by P1 and P2. The signature of A includes the siblings of P1 and the signature of B includes the siblings of P2. Both the signatures share the sibling of P3. A client can cache and reuse the sibling of P3 and only the parts that are not in P3 need to be retransmitted for authenticating B. Maximizing the shared path between two objects that are likely to be accessed in a short time interval reduces the network traffic.

Furthermore, the invention provides a method that exploits object access patterns to reduce both the number of public key operations and the size of signatures. The aspects of object access patterns that are considered include read clusterness, write clusterness, and read order. Based on read clusterness and write clusterness, objects are partitioned into different authentication trees as follows: I) the objects that are likely to be written together are grouped into the same authentication tree; II) the objects that are likely to be read together are also grouped into the same authentication tree.

Placing objects that tend to be written together reduces the number of public key infrastructure (PKI) operations by publishers and clients during writes. A publisher only needs to authenticate the root of the authentication tree once for a set of writes. A client also only needs to check one new version of the signature of the root. The invention also reduces signature size by exploiting the order that those objects are read. The basic idea is to cache and reuse the part of signatures of previously read objects.

Figure 2:
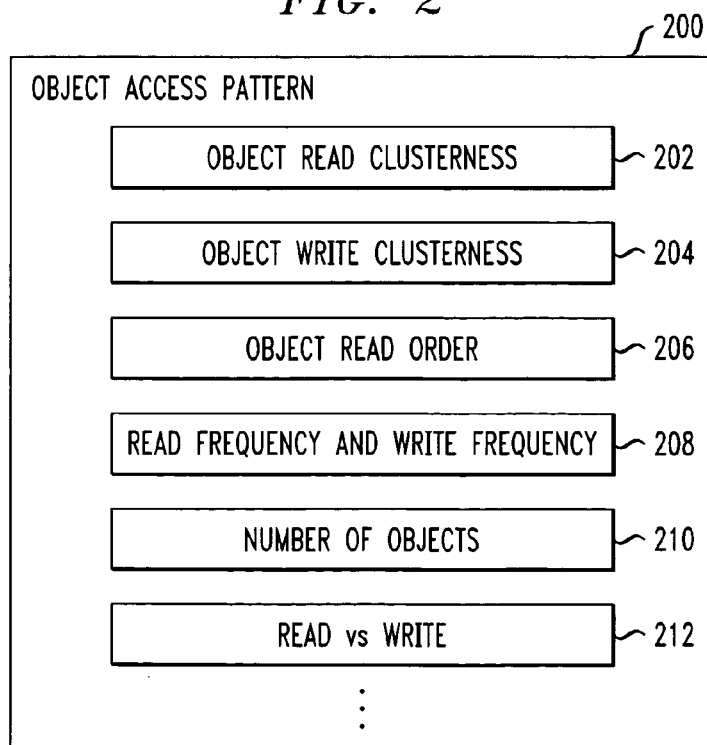
FIG. 2 is a diagram illustrating an object access pattern, according to an embodiment of the present invention.

FIG. 2 is a diagram illustrating an object access pattern, according to an embodiment of the present invention. More particularly, while FIG. 2 shows many aspects of an object access pattern 200 that are provided for efficient authentications, other aspects that are not expressly shown may be provided. Some of these aspects can include object read clusterness (202), object write clusterness (204), object read order (206), read frequency, write frequency, and read frequency related write frequency (208), the number of clients in the system, the number of objects in the system (210), the number of clients that read each object, the object popularity related to read and write frequency, consistency requirements of the system, whether the system is dealing with a read operation versus a write operation (212), and so on.

Figure 3:
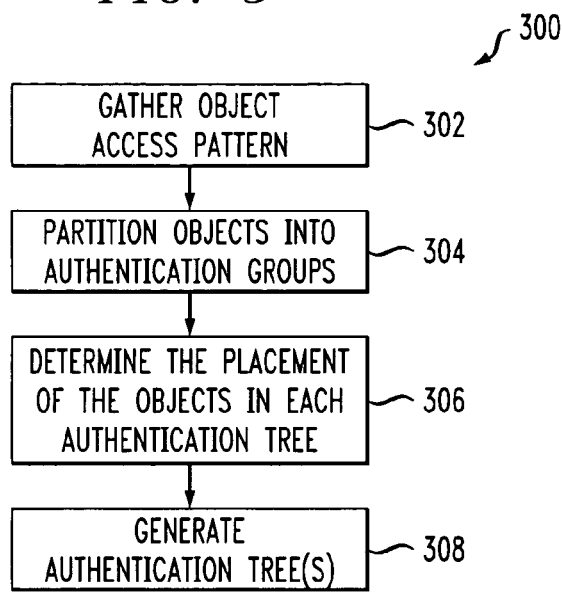
FIG. 3 is a diagram illustrating a methodology for generating authentication trees, according to an embodiment of the present invention.

FIG. 3 is a diagram illustrating a methodology for generating authentication trees, according to an embodiment of the present invention. More particularly, FIG. 3 shows possible steps to be taken by a web server (part of the context distribution system) to generate authentication trees. The server first captures an object access pattern (step 302). This information will guide steps 304 and 306. Some illustrative mechanisms for capturing such patterns are described below in the context of FIG. 4. After capturing the object access pattern, the server uses the object access pattern(s) to divide objects into multiple authentication groups (step 304). Each group may be authenticated with an authentication tree, although other authentication methods that exploit object access clusterness can also be used. Another aspect of object access pattern, i.e., the access order, is also fed into the system to guide the placement of the objects in an authentication tree (step 306). Good placement allows a maximum amount of signatures of previous objects to be reused for the authentication of currently read objects. Thus, the one or more authentication trees are generated (step 308).

Figure 4:
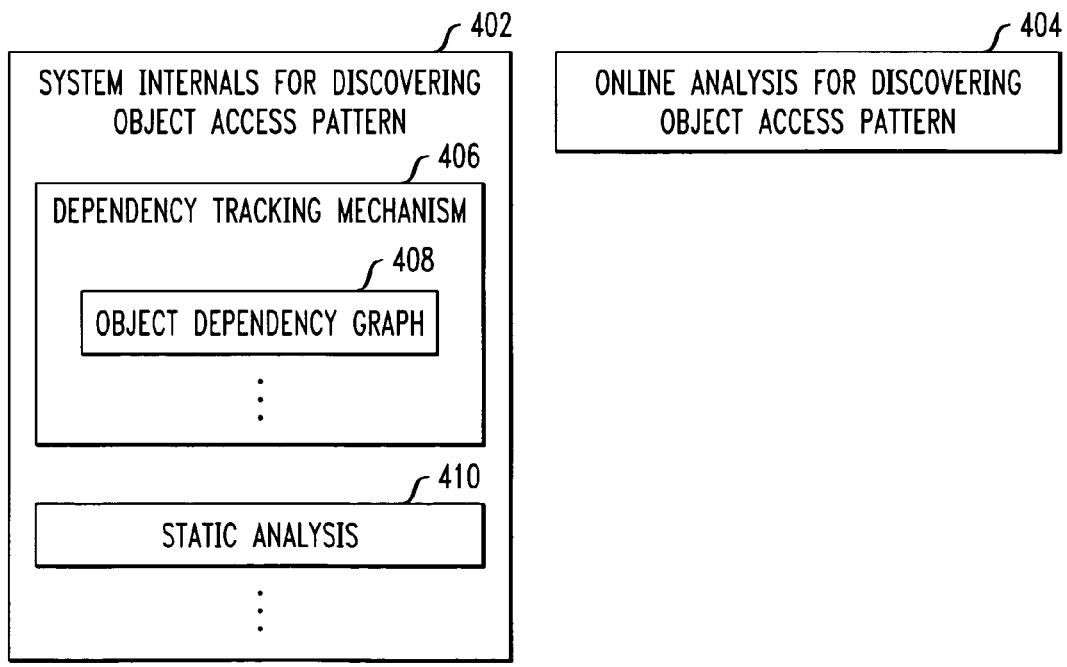
FIG. 4 is a diagram illustrating various illustrative mechanisms to extract object access patterns, according to embodiments of the present invention.

FIG. 4 illustrates various illustrative mechanisms to extract object access patterns, according to embodiments of the present invention. These mechanisms can be classified into two categories: using system internal mechanisms (internals) 402 and using online analysis 404. The system internals 402 include dependency tracking mechanisms 406 such as object dependency graph 408, static analysis of the code 410 of the application, and so on. In online analysis 404, the system analyzes which objects are written and read by what clients and when these reads and writes happen.

One example to capture write clusterness is to use write sets. FIG. 5 illustrates examples of write sets W1, W2, W3, W4, W5 and W6. A write set can have two components: its elements and its weight. The members of a write set are the objects contained in the write set, i.e., the set of objects that are often written together. The weight of a write set is a number indicating how likely it is that the objects are written together. The weight can be normalized by scaling all the weights proportionally.

For example, the elements of W1 are A,C and its weight is 3, which indicates A and C are often written together but less frequently than a write set with a higher weight such as W2.

One way to generate write sets is by inferring them from an object dependency graph or ODG (408 of FIG. 4). One method is to place objects within one connected component of an ODG into a write set. Another method is to place leaf objects reachable from a maximal node into a write set.

Figure 6:
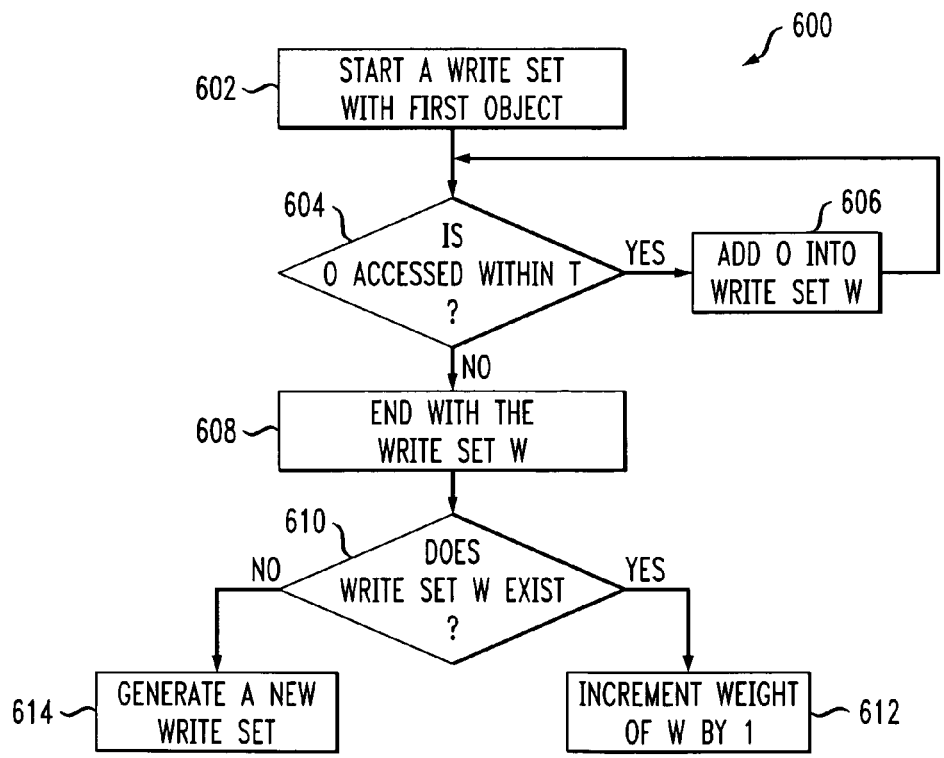
FIG. 6 is a diagram illustrating a methodology for generating write sets, according to an embodiment of the present invention.

Another way to generate write sets is to analyze object read and/or write patterns online (404 of FIG. 4). One method is to group writes which occur within T units of time together. Such a process 600 is illustrated in FIG. 6. Initially, a write set begins with the first object that is updated (step 602). When the second object O is updated, the process determines if the update of O is within T units of time of the first write (step 604). If this is true, O is added into the write set (step 606) and the process continues. Otherwise, the process ends with the write set W (step 608). Then, the process determines if the write set W exists previously (step 610). If so, the weight of W is incremented by one (step 612). Otherwise, a new write set is generated (step 614).

Reads by one client can be grouped into one read set. In some cases, it is useful to further require the reads in one read group to be within T units of time, similar to the method for write sets. In this case, the process to generate read sets is similar to that of generating write sets. Generating read sets with a threshold T can help to reduce the average load of a client over a period of time.

Once write sets and read sets are generated, the next step is to partition the objects into authentication groups. This process may include three steps as illustrated in FIG. 7. The first step (step 702) of process 700 is to group objects in a write set together. Then, the read set is transformed by replacing the object with the write set containing the object (step 704). Lastly, the authentication group is generated by grouping the objects in a read set starting with the highest weight (step 706). The process continues grouping the objects until the pre-specified size of authentication groups is reached.

An example of such a process is illustrated in FIG. 8. In this example, objects are being grouped into authentication groups of size 4. There are four read sets R1, R2, R3, and R4 denoted as 802 in FIG. 8. The elements of R1 are A, I, and J, and the weight of R1 is 3. Here, the weight of each read set is the number of accesses of these read sets in a given interval. The weight can also be normalized. The elements and weights have the same meaning for other read sets, R2, R3, and R4.

The example uses the write sets illustrated in FIG. 5. First, we group the objects in write sets together (step 702 of FIG. 7). Thus, we have six initial groups, W1, W2, W3, W4, W5, and W6. Next, the read sets are transformed based on write sets (step 704 of FIG. 7). As an example, the elements of R1, A, I, and J, are replaced by the write sets to which those elements belong. Since A is in the write set W1, I is in the write set W3, and J is in the write set W6, the elements of R1 are replaced by W1, W3, and W6. The same transformation is carried out for R2, R3, and R4. The transformed read sets are denoted as 804 in FIG. 8.

The last step (step 706 of FIG. 7) is to go through the read sets in the order of weight to further group objects. Here, R2 is processed first. R2 contains W2 and W5. The objects in W2 and W5 are grouped together. At this point, the size of authentication groups is reached. D, G, W, and T are output as Authentication Group 1. The same process is carried out to generate Authentication Group 2 and Authentication Group 3. The authentication groups are denoted as 806 in FIG. 8. At this point, when every object is in an authentication group; the process stops. Each authentication group can be authenticated with authentication trees.

In the remainder of the illustrative description, it is assumed that authentication trees are used to authenticate authentication groups. In particular, Authentication Group 1 (in 806 of FIG. 8) is used as an example.

Figure 9:
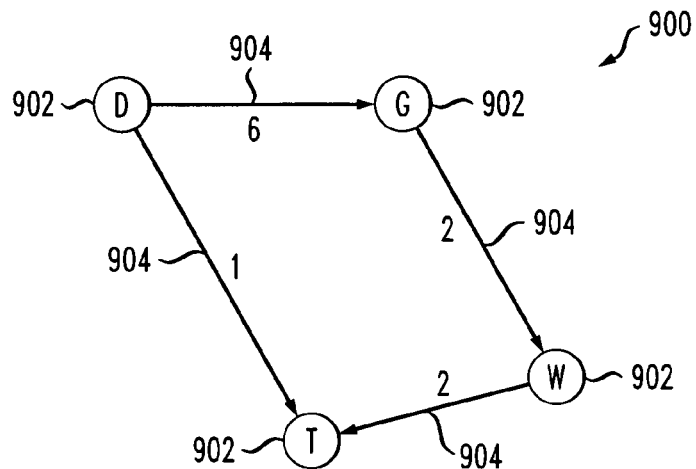
FIG. 9 is a diagram illustrating a read order graph, according to an embodiment of the present invention.

Authentication costs can be further reduced by placing objects in authentication trees based on a likely order that objects may be accessed in. First, a read order graph is generated. FIG. 9 illustrates an example of a read order graph. In a read order graph, the nodes 902 such as D, G, W, and T are the objects. A weight associated with a direct edge 904 between two nodes represents the number of times that an access of the first node precedes that of the second node. For example, an edge from D to G with a weight of 6 represents that there are six times in which D is first accessed and then G. The process can further require the time between two successive accesses to be within a certain amount of time to increase the weight of the edge between the two nodes.

Once an object order graph is obtained, the objects can be placed accordingly. One method is to do a depth-first traversal of a read order graph to generate an order in which an object is to be placed into an authentication tree. In the graph illustrated in FIG. 9, the process first starts with the node with the heaviest outward edge. In this case, it is D. Then, the process does a depth-first traversal of the graph by following the heaviest outward edge first. In this case, it is G next, and then W and T. The resulting sequence is called an object access order (OAR).

Figure 10:
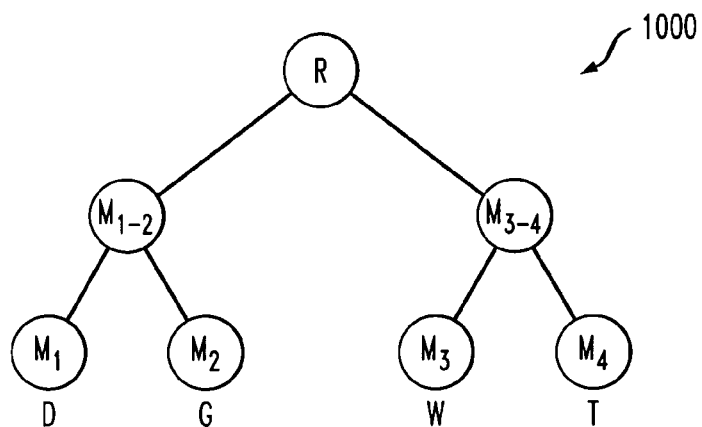
FIG. 10 is a diagram illustrating an authentication tree, according to an embodiment of the present invention.

FIG. 10 illustrates an authentication tree 1000. The leaves of the tree are hashes of the objects. This type of tree is known as a Merkle hash tree, see, e.g., R. Merkle, "A Certified Digital Signature," Proceedings of Crypto'89. The invention provides novel methods for constructing Merkle hash trees. For example, the leaf $M_1$ results from applying a secure hash function H over the object D. The objects are placed from right to left in the same order as OAR. An intermediate node is the hash of its two children. For example, $M_{1-2}$ is the parent of $M_1$ and $M_2$, and $M_{1-2}$ is calculated by apply the secure hash function H over the string $M_1$ and $M_2$ appended together. The root is also signed with a public key after hashing its two children. In this example, the result of hashing is $M_{1-4}$. Generating a public key signature over this hashing results in $PKI(M_{1-4})$.

The signature of objects includes the root of the tree and the siblings of nodes along the path from the node to root. Hence, the signature of D is $M_2$, $M_{1-2}$, and R. To verify an object, a client can just apply the hash function along the path from the object to the root and generate the root hashing $M_{1-4}$ and then verify if R is a public key signature of the root hashing.

Figure 11:
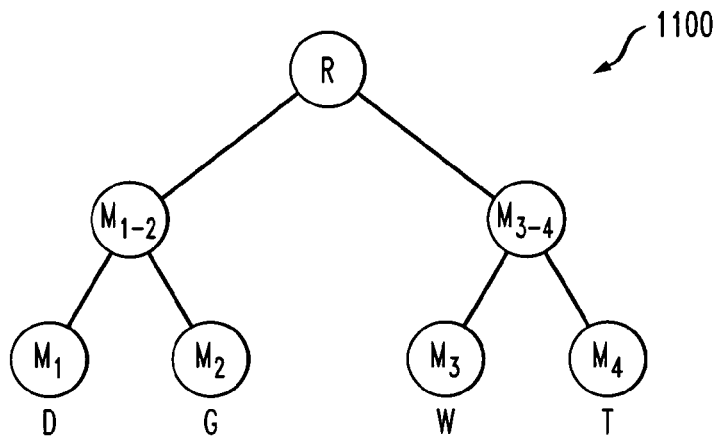
FIG. 11 is a diagram illustrating placement of objects in an authentication tree according to access order, according to an embodiment of the present invention.

FIG. 11 illustrates the benefits of placing objects according to their access order. Note that authentication tree 1100 in FIG. 11 represents the same example as authentication tree 1000 in FIG. 10. The verification of G after D is used as an example. The signatures of D and G share all the hashes except the first one. Even the first hash for verifying G, $M_2$, can be computed by hashing the object D since $M_2=H(G)$. Thus, when a client verifies G after D, no hashes are needed to be sent given that the previous hashes are cached. Since objects that are often accessed successively are placed into the authentication trees together, the average savings can be significant.

Note that the algorithm for clustering objects by read and write patterns illustrated in FIGS. 8 through 11 can be applied to other problems outside the domain of authentication. For example, it is often desirable to cluster objects in disk storage by read and write patterns. When objects are clustered in proximity to each other on disk based on read and/or write patterns, performance can be improved considerably. Therefore, the clustering methodology of the invention can be used by disk storage systems to cluster objects by access locality. Such use of the invention can improve disk storage performance including throughput and/or read latency.

Given the teachings of the invention provided herein, some additional implementations and advantages that may be realized there from will now be described.

For example, one example of partitioning objects in accordance with the invention may include first considering write sets and then considering read sets. Objects in write sets are first grouped together. The weight on write sets can be considered too. A threshold W can be set on the weight. Only write sets with a weight greater than W are grouped together. Then, the initial groups are grouped together according the read sets. This method can reduce server overhead and client overhead in respect to object updates. This method works particularly well when write sets are small.

Further, the size of an authentication group can be adjusted by the system. Large authentication groups can be used to reduce server overhead at the expense of client overhead and signature size. Still further, in some implementations, each object may be assigned to only one authentication tree. In other implementations, some objects can be assigned to multiple object trees. Assigning objects to multiple authentication trees can reduce clients overhead at the expense of servers' overhead.

In some cases, an intermediate layer can send the old version of signatures of an object to a client if the object has not changed, and the change of other objects can prompt the generation of new signatures for the authentication tree.

As is evident, the teachings of the invention described herein also provide a method for exploring object read order to reduce network bandwidth consumption of authentication. Further, the invention can capture the most likely order in which objects are read. One method to capture read order may be through a read order graph. The nodes in a read order graph are the objects. The direct edge between these nodes represents the order of accesses. When a client accesses object A and then accesses object B within a threshold time of t, the directed edge between A and B is incremented by one.

An illustrative method for generating an order in which objects are placed in an authentication tree according to a read order graph may include the following steps. The method first picks up an object O1 that is connected to the heaviest outgoing edge. Then, the method traverses the graph depth-first and follows the heaviest outgoing edge first.

Further, the methodologies of the invention allow a client to cache a signature of a previously read object to authenticate a new object. The client only needs to retrieve the part of the signature that is not in previous signatures to authenticate a new object.

Still further, a client can adjust the number of signatures it wants to cache based on its memory size, write frequency, and the cost of network bandwidth.

Also, an intermediate layer can track an object and thus which signatures a client already has through the Internet Protocol (IP) address or cookies of the client. A client can also inform the intermediate layer which signature it has cached in its request for a new object.

It is to be further appreciated that the present invention also comprises techniques for providing content delivery services. By way of example, a content provider agrees (e.g., via a service level agreement or some informal agreement or arrangement) with a customer or client to provide content. Then, based on terms of the service contract between the content provider and the content customer, the content provider provides content to the content customer in accordance with one or more of the clustering and authentication methodologies of the invention described herein. Similarly, disk storage services could also be provided.

Figure 12:
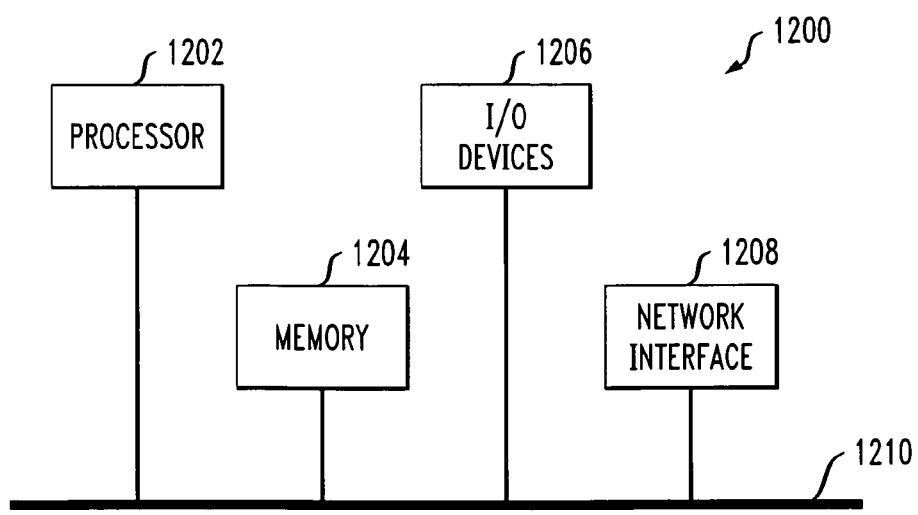
FIG. 12 is a diagram illustrating an illustrative hardware implementation of a computing system in accordance with which one or more components/steps of a content distribution system may be implemented, according to an embodiment of the present invention.

Referring finally to FIG. 12, a block diagram illustrates an illustrative hardware implementation of a computing system in accordance with which one or more components/steps of a content distribution system (e.g., components and methodologies described in the context of FIGS. 1 through 11) may be implemented, according to an embodiment of the present invention. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system 1200 may be implemented in accordance with a processor 1202, a memory 1204, I/O devices 1206, and a network interface 1208, coupled via a computer bus 1210 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a Web-based content distribution system with at least one server and at least one client, a method for one of generating at the server and reading at the client authentication information in the form of one or more signatures, wherein the authentication information provides evidence that a plurality of objects were one of generated and sent by an entity, comprising a computer system performing step of:

determining at the server one or more object access patterns;

using at the server the one or more object access patterns indicative of whether at least two of the plurality of objects are accessed within a similar time period to group objects together to reduce an overhead for at least one of generating at the server and reading at the client the authentication information, wherein the authentication information comprises the one or more signatures;

wherein the using the one or more object access patterns step further comprises an accessed object being read or updated, and grouping objects together using at least one graph wherein the at least one graph comprises at least one Merkle hash tree, the object grouping step further comprising placing two objects of the objects being grouped in a same graph if the objects have similar access patterns;

maintaining at the server a set of objects which are likely to be updated in close temporal proximity to each other, wherein the maintaining step further comprises determining the set of objects using at least one of an object dependency graph, analysis of code generating the set of objects likely to be updated, and on-line analysis of change patterns of the set of objects likely to be updated;

maintaining at the server a set of objects which are likely to be read in close temporal proximity to each other, wherein the maintaining step further comprises determining the set of objects using at least one of analysis of code which reads the set of objects likely to be read, and analysis of read patterns of the set of objects likely to be read;

partitioning at the server objects to be transferred across the content distribution system into authentication groups having respective signatures associated therewith using write sets with a weight exceeding a threshold;

partitioning at the server objects to be transferred across the content distribution system based on read sets;

wherein objects to be transferred across the content distribution system are assigned to the authentication groups and a size of an authentication group can be adjusted to trade off central processing unit overhead and a signature size, an old version of a signature of an object is used if the object has not changed, and an object read order is explored to reduce a size of authentication information transferred across the content distribution system;

the client caching a signature of a previously read object to reduce the overhead for a future authentication;

the client adjusting a number of cached signatures based on one of memory size, write frequency, and a network bandwidth cost;

an intermediate layer tracking which signatures the client has cached using client identification information, wherein the identification information comprises one of an Internet Protocol address and a cookie; and the client informing the intermediate layer of a signature the client has cached in a request for a new object.

* * * * *